United States Patent Office

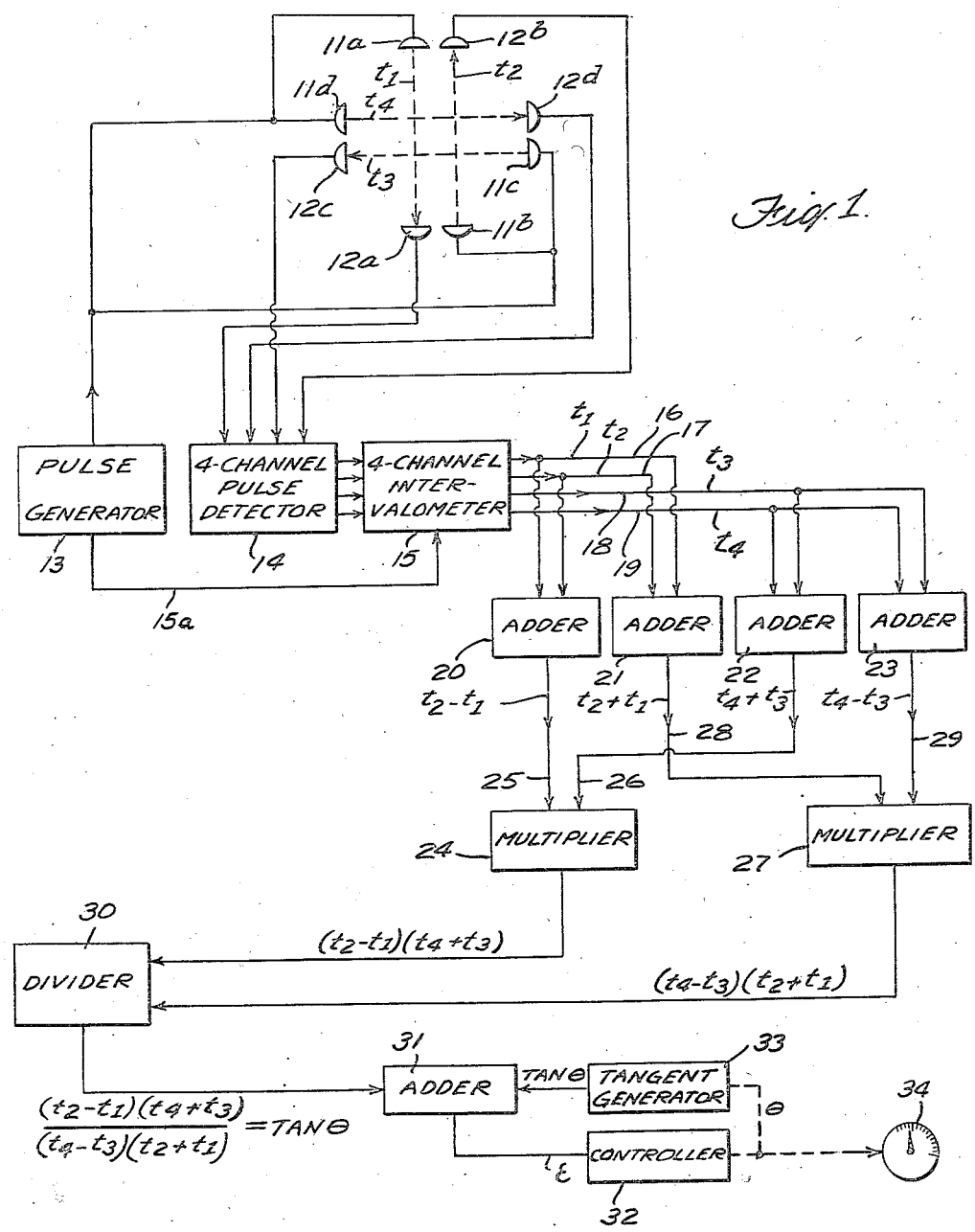

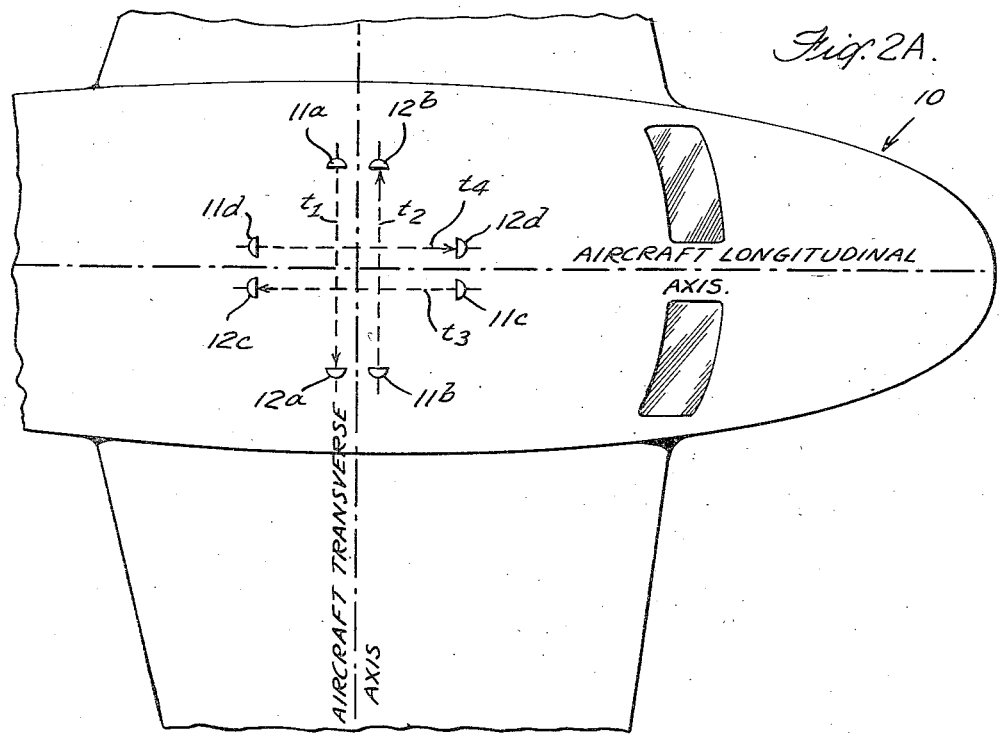
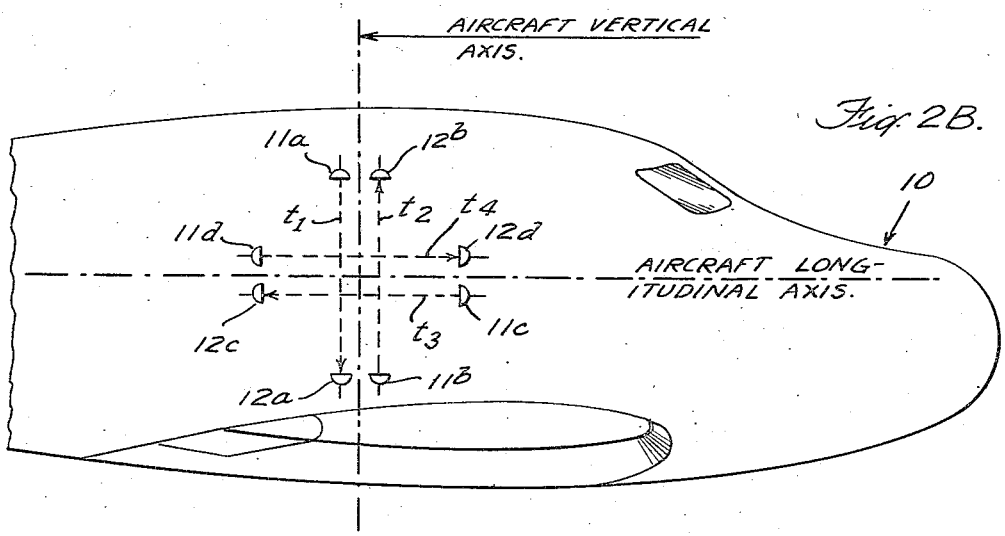
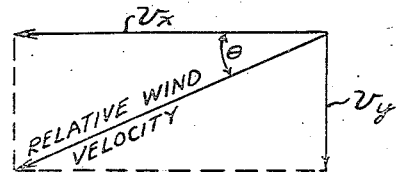

2,821,083
Patented Jan. 28, 1958

2,821,083

SONIC AIR STREAM DIRECTION DETECTOR SYSTEM

Victor H. Seliger, Forest Hills, N. Y., assignor to Sperry Rand Corporation, a corporation of Delaware Application January 19, 1955, Serial No. 482,750

5 Claims. (Cl. 73—180)

This invention relates to a system for measuring the angle of yaw, angle of attack or other angle relating to the direction of air stream of an airborne aircraft, and particularly to such a system which employs sound waves as the detecting means.

One of the unique features of the invention resides in the means which is exposed to the air stream for detecting the direction of air stream flow relative to the aircraft orientation. These means include a provision for emitting sound pulses into the air stream in specified directions with respect thereto and for receiving the pulses so that the effect of the air flow on the sound transmission may be determined. The propagation and detection of the sound waves are achieved without exposing moving parts to the relatively high velocity flow which has hitherto been the cause of some of the operative difficulties besetting other air stream direction sensing apparatus. In place of rotating or reciprocating parts, this invention contemplates that only stationary or vibrating parts will be exposed. The exposed elements are those which are required for sound transduction from and into electrical energy.

An object of the invention is to provide means for determining the component velocities of the air stream of an airborne aircraft with respect to its axes, said means being durable and relatively invulnerable to weather and air movements to which they are necessarily exposed.

Another object of the invention is to provide a computer system which employs component velocities of the air stream to determine the direction of flow of the air stream with respect to the airborne aircraft creating it.

Other objects and advantages of the invention may become apparent from reading the detailed specification and the accompanying drawings, wherein:

Fig. 1 is a diagrammatic illustration of the invented system including the computing and indicating units;

Fig. 2A is a plan showing the disposition of the propagating and detecting units relative to the longitudinal and transverse axes of the aircraft;

Fig. 2B is a side elevation showing the disposition of the same elements relative to the longitudinal and vertical axes of the aircraft; and Fig. 3 is a graphic illustration of the geometry of the problem which is solved by the detecting and computing units of the system.

The emission and detection of the sound pulses in the air stream of the moving aircraft 10 is accomplished by electro-acoustic transducers, the wave propagation elements 11a, 11b, 11c and 11d, and detection elements 12a, 12b, 12c and 12d of which are disposed outside the aircraft as shown in Figs. 2A and 2B. In Fig. 2A the elements are disposed in a horizontal plane and are thus adapted to measure the angle of yaw. In Fig. 2B the elements are disposed in a vertical plane on the aircraft whereby the computer may be employed to measure the angle of attack.

Two pairs of transducer elements are disposed parallel to or in coincidence with the longitudinal reference axis of the aircraft and two pairs of transducer elements are disposed parallel to or in coincidence with a transverse axis of the aircraft at right angles to the first mentioned pair of elements. Transverse axis is herein defined as an axis normal to the longitudinal axis and may lie in the vertical or horizontal plane. The wave propagation elements 11a, 11b, 11c and 11d, of each pair are oppositely situated in relation to their respective detection elements 12a, 12b, 12c and 12d, so that the sound pulses are emitted in opposite directions along the aircraft axes.

The pulses for the four propagation elements are generated by pulse generator 13 to which each element is electrically connected. The four detection elements of the transducers are in turn connected to a four-channel pulse detector 14 which rectifies the electric pulse waves produced by said detection elements. A four channel intervalometer 15 is connected to the detector 14 and the pulse generator 13 by means of lead 15a. The intervalometer is employed indirectly to measure the components of air stream velocity relative the aircraft axes by directly measuring the effect of the air stream on sound pulses oppositely emitted in the air stream parallel to the longitudinal and transverse axes of the aircraft. That is, the intervalometer serves to measure the time intervals between the generated pulse and the pulse picked up by the detection elements in each of the four channels.

The intervalometer 15 has four output channels which may be designated 16, 17, 18 and 19. In accordance with the formulation shown below the channels are connected to adders 20, 21, 22 and 23. That is, channels 16 and 17 are each connected to both adders 20 and 21; channels 18 and 19 are each connected to both adders 22 and 23. A multiplier 24 is connected to the adders 20 and 22 through channels 25 and 26, respectively, and multiplier 27 is connected to adders 21 and 23 through channels 28 and 29, respectively. In order to divide the output of multiplier 24 by the output of multiplier 27, a divider 30 is connected to the two multipliers. As mathematically demonstrated below, the result of the computation at this stage is equal to the tangent of the air stream direction angle.

The divider 30 is connected to an adder 31 which is connected on its output side to a controller 32. The controller is connected to tangent generator 33 which in turn is connected to the adder 31 thus providing an error eliminating feed back therefor. Elements 31, 32, and 33 comprise a closed-loop servomechanism. The controller 32 is also operatively connected to dial indicator 34. When the controller operated generator 33 sets into the adder 31 the same input quantity as that introduced by the divider 30, the adder output error $\epsilon$ is zero. This condition insures that the servo driven dial indicator 34 registers the correct value for $\theta$.

The basic principle upon which the air stream detector operates is that the time required for sound waves to travel between the transducer elements in air is dependent upon the velocity of sound in air and the velocity of the air along the virtual line connecting the elements. The latter velocities are evidently the components of air stream velocity relative to the aircraft longitudinal and transverse axes. The geometry involved is illustrated in Fig. 3. Equations may be written which relate the air stream velocity components and the transmission times of sound pulses between propagating and detecting elements. These equations are:

$$(V+v_y)t_1 = d_1 \quad (1)$$
$$(V-v_y)t_2 = d_2 \quad (2)$$
$$(V+v_x)t_3 = d_3 \quad (3)$$

and $$(V-v_x)t_4 = d_4 \quad (4)$$

where $V$ = velocity of sound in air
$v_x$ = component of relative wind along the aircraft longitudinal axis
$v_y$ = component of relative wind perpendicular to the aircraft longitudinal axis and along the transverse axis
$t_1$, $t_2$, $t_3$ and $t_4$ are the times of transmission of sound between elements 11a and 12a, 11b and 12b, 11c and 12c, and 11d and 12d, respectively
$d_1$, $d_2$, $d_3$ and $d_4$ are the distances between elements 11a and 12a, 11b and 12b, 11c and 12c, and 11d and 12d, respectively If distance $d_1$ is made equal to $d_2$, and distance $d_3$ is made equal to $d_4$, we obtain from Equations 1, 2, 3 and 4:

$$(V+v_y)t_1 = (V-v_y)t_2 \quad (5)$$

and $$(V+v_x)t_3 = (V-v_x)t_4 \quad (6)$$

From Fig. 3 we have the relation $$\tan\theta = \frac{v_y}{v_x} \quad (7)$$

where $\theta$ = the air stream direction angle.

From (5), (6), and (7), by algebra, we obtain, successively, $$v_y = V\left(\frac{t_2-t_1}{t_2+t_1}\right)$$

$$v_x = V\left(\frac{t_4-t_3}{t_4+t_3}\right)$$

and finally, $$\tan\theta = \frac{v_y}{v_x} = \frac{(t_2-t_1)(t_4+t_3)}{(t_4-t_3)(t_2+t_1)} \quad (8)$$

In this invention, Equation 8 is solved by the above described computer which has inputs of $t_1$, $t_2$, $t_3$ and $t_4$ provided by an intervalometer, and which provides an output of $\theta$, the air stream direction angle.

There are of course various ways of mechanizing the discovered formulation which will occur to those skilled in the computer art. Circuit details may easily be provided without departing from the scope of the invention as defined in the following claims.

What is claimed is:

1. In a system for the measurement of air stream direction with respect to the axes of an airborne aircraft, four pairs of sound wave propagation and detection elements, the elements of each pair being mounted on the outer surface of an aircraft fuselage, the propagation elements of the first two pairs being adapted to emit sound pulses in opposite directions along the longitudinal aircraft axis and the propagation elements of the second two pairs being adapted to emit sound pulses in opposite directions along the transverse aircraft axis, one of said detection elements being positioned with reference to one of said axes in the path of the sound pulses emitted by each of said propagation elements, a pulse generator connected to the propagation elements, intervalometric means connected to said detection elements for measuring the periods of time taken by the pulses to travel between each of the four pairs of propagation and detection elements and means connected to said last mentioned means for deriving a ratio of velocity components of the air stream with respect to said longitudinal and transverse axes in terms of said time periods whereby said ratio may be employed to compute trigonometrically air stream direction.

2. A system for the measurement of air stream direction with respect to the axes of an airborne aircraft comprising four pairs of sound wave propagation and detection elements, the elements of each pair being mounted on the outer surface of an aircraft fuselage, the propagation elements of the first two pairs being adapted to emit sound pulses in opposite directions along the longitudinal aircraft axis and the propagation elements of the second two pairs being adapted to emit sound pulses in opposite directions along the transverse aircraft axis, the propagation elements of the first pair being separated from their respective detection elements by equal distances, the propagation elements of the second pair being separated from their respective detection elements by equal distances, one of said detection elements being positioned with reference to one of said axes in the path of the sound pulses emitted by each of said propagation elements, a pulse generator connected to the propagation elements, a pulse detector connected to the detection elements, an intervalometer connected to said pulse detector, adders connected to said intervalometer so as to add the times of sound travel between the elements of the first pairs of elements and the times of sound travel for the second pairs of elements and subtract the same, multipliers connected to said adders to multiply the subtracted time values of the first pairs with the added time values of the second pairs and multiply the subtracted time values of the second pairs with the added time values of the first pairs, a divider connected to said multipliers adapted to divide the one product by the other product and angle indicating means connected to said divider for indicating the angles whose trigonometric functions correspond to the ratio of one product to the other product.

3. A system as claimed in claim 2 wherein a servo-mechanism is employed to place the divider output in the angle indicating means, said servo having a controller and feed-back means for assuring indicator accuracy.

4. In a system for the measurement of air stream direction with respect to the axes of an airborne aircraft wherein there is provided four pairs of sound wave propagation and detection elements, the elements of each pair being mounted on the outer surface of an aircraft fuselage, the propagation elements of the first two pairs being adapted to emit sound pulses in opposite directions along the longitudinal aircraft axis and the propagation elements of the second two pairs being adapted to emit sound pulses in opposite directions along the transverse aircraft axis, the propagation elements of the first pair being separated from their respective detection elements by equal distances, the propagation of the second pair being separated from their respective detection elements by equal distances, one of said detection elements being positioned with reference to one of said axes in the path of the sound pulses emitted by each of said propagation elements, a pulse generator connected to the propagation elements, a pulse detector connected to the detection elements, a computer comprising an intervalometer connected to said pulse detector, adders connected to said intervalometer so as to add the times of sound travel between the elements of the first pairs of elements and the times of sound travel for the second pairs of elements and subtract the same, multipliers connected to said adders to multiply the subtracted time values of the first pairs with the added time values of the second pairs and multiply the subtracted time values of the second pairs with the added time values of the first pairs, a divider connected to said multipliers adapted to divide the one product by the other product and angle indicating means connected to said divider for indicating the angles whose trigonometric functions correspond to the ratio of one product to the other product.

5. A system as defined in claim 1 wherein trigonometric computing means are connected to said velocity component ratio deriving means for determining air stream direction.

References Cited in the file of this patent

UNITED STATES PATENTS

| | | |
|---|---|---|
| 2,669,121 | Garman et al. | Feb. 16, 1954 |
| 2,708,366 | Blocher et al. | May 17, 1955 |

FOREIGN PATENTS

| | | |
|---|---|---|
| 616,794 | Great Britain | Jan. 27, 1949 |
| 623,022 | Great Britain | May 11, 1949 |